(12) United States Patent
Dewar et al.

(10) Patent No.: US 11,546,226 B2
(45) Date of Patent: *Jan. 3, 2023

(54) SYSTEM AND METHOD FOR SIMULATING NETWORK EVENTS

(71) Applicant: VOCALINK LIMITED, London (GB)

(72) Inventors: Michael Alan Dewar, Richmond (GB); Prina Rajendra Kumart Patel, Ealing (GB)

(73) Assignee: VOCALINK LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/702,989

(22) Filed: Mar. 24, 2022

(65) Prior Publication Data

US 2022/0217055 A1    Jul. 7, 2022

Related U.S. Application Data

(63) Continuation of application No. 16/437,805, filed on Jun. 11, 2019, now Pat. No. 11,290,342.

(30) Foreign Application Priority Data

Jun. 14, 2018   (EP) .................................... 18177668

(51) Int. Cl.
*G06F 16/28* (2019.01)
*G06Q 20/02* (2012.01)
(Continued)

(52) U.S. Cl.
CPC .......... *H04L 41/145* (2013.01); *G06F 16/288* (2019.01); *G06Q 20/023* (2013.01); *H04L 41/12* (2013.01); *H04L 43/02* (2013.01)

(58) Field of Classification Search
CPC ....... H04L 41/12; H04L 41/14; H04L 41/145; H04L 43/02; H04L 43/022; H04L 43/024
(Continued)

(56) References Cited

U.S. PATENT DOCUMENTS

| | | | |
|---|---|---|---|
| 2003/0065527 A1* | 4/2003 | Yeh ........................ | G06Q 40/00 705/35 |
| 2003/0149650 A1* | 8/2003 | Yeh ........................ | G06Q 40/00 705/35 |

(Continued)

OTHER PUBLICATIONS

"Communication: Extended European Search Report", dated Oct. 5, 2018 (Oct. 5, 2018), for European Application No. 18177668.3-1216, 15pgs.

(Continued)

*Primary Examiner* — Younes Naji
*Assistant Examiner* — Da T Ton
(74) *Attorney, Agent, or Firm* — Buckley, Maschoff & Talwalkar LLC (57) ABSTRACT

A system for simulating a network includes a request processor operably connected to a simulation engine. The request processor receives a request for network simulation data and input data relating to a topology of a network including node data and relationship data with relationship parameters. The simulation engine outputs a stream of event data based on the relationship data to the request processor and generates respective events by determining a source node and a destination node and corresponding relationship parameters, determining an event time, and determining a transfer value. The simulation engine also, in response to a determination that the transfer value does not exceed a current resource level of the source node, decrements the current resource level of the source node by the transfer value, increments a current resource level of the destination node by the transfer value, generates event data, spawns an event generation process, transmits update data, spawns at least one additional event generation process, and streams the event data to the request processor for transmission to a user device.

15 Claims, 5 Drawing Sheets

(51) Int. Cl.
   *H04L 41/12* (2022.01)
   *H04L 41/14* (2022.01)
   *H04L 43/02* (2022.01)

(58) Field of Classification Search
   USPC .................................. 709/223–225, 231–232
   See application file for complete search history.

(56) References Cited

U.S. PATENT DOCUMENTS

| | | |
|---|---|---|
| 2004/0243369 A1 | 12/2004 | Carey et al. |
| 2011/0320355 A1 | 12/2011 | Pasha et al. |
| 2018/0081787 A1* | 3/2018 | Riddick ................ G06Q 20/20 |
| 2018/0365674 A1* | 12/2018 | Han ........................ G06F 30/20 |

OTHER PUBLICATIONS

Information Disclosure Statement dated dated Jun. 11, 2019 which was filed in connection with U.S. Appl. No. 16/437,805.

PCT Notification of Transmittal of International Search Report and Written Opinion, International Searching Authority dated Jul. 2, 2019 (Jul. 2, 2019), International Application No. PCT/EP2019/059845, 20pp.

892 Form dated Nov. 12, 2020 which was received in U.S. Appl. No. 16/437,805.

Information Disclosure Statement dated dated Mar. 22, 2022 which was filed in connection with U.S. Appl. No. 16/437,805.

892 Form dated May 25, 2021 which was received in U.S. Appl. No. 16/437,805.

892 Form dated Nov. 18, 2021 which was received in U.S. Appl. No. 16/437,805.

Notice of Allowance dated Dec. 9, 2021 which was received in U.S. Appl. No. 16/437,805.

* cited by examiner

SYSTEM AND METHOD FOR SIMULATING NETWORK EVENTS

CROSS-REFERENCE TO RELATED APPLICATION

This application is a continuation application of U.S. application Ser. No. 16/437,805 filed on Jun. 11, 2019, which is a U.S. National Stage filing under 35 U.S.C. § 119, based on and claiming the benefits of and priority to European Application No. 18177668.3 filed on Jun. 14, 2018. The entire disclosures of the above patent applications are incorporated herein by reference for all purposes.

BACKGROUND

The present invention relates to network simulation methods and systems.

Commercial-scale computer networks can be large and complex, and accordingly, it can be difficult to understand their behaviour using analytical methods such as those based on graph theory. For this reason, engineers or technicians wishing to gain insight into network behaviour have more recently turned to network simulation software.

A particular problem which arises in computer networks used in the financial industry, such as card payment networks or Automated Clearing House (ACH) systems, is that in addition to their complex topology, the nature of the data being transmitted across the network is highly confidential. Testing of algorithms (such as fraud detection algorithms) or network performance is therefore challenging, because of data security and privacy requirements. In addition, there can be data ownership issues since network participants may own the data rather than it being centrally available. Payments data is extremely sensitive in nature and thus access to it, and subsequent analysis, requires strict compliance with the law, typically meaning that access can only be obtained in restricted physical or digital environments.

The present invention seeks to address the above difficulties.

SUMMARY

In one aspect of the present disclosure, there is provided a network simulation system that includes a request processor configured for receiving a request for network simulation data and input data relating to a topology of a network, the input data comprising node data indicative of respective resource levels of a plurality of nodes of the network, and relationship data indicative of respective relationship parameters of a plurality of relationships between at least some of the nodes, the relationship parameters including at least a rate parameter and a transfer value parameter. The network simulation system also includes a simulation engine operably connected to the request processer, wherein the simulation engine outputs a stream of event data that is based on the relationship data to the request processor.

The simulation engine generates respective events by determining a source node and a destination node, and corresponding relationship parameters for the relationship between the source node and the destination node; determining an event time based on the rate parameter of the corresponding relationship parameters; determining a transfer value based on the transfer value parameter and a random sampling from a transfer value distribution; and responsive to a determination that the transfer value does not exceed a current resource level of the source node, decrementing the current resource level of the source node by the transfer value; incrementing a current resource level of the destination node by the transfer value, generating, at the event time, event data comprising a timestamp, a source node identifier of the source node, a destination node identifier of the destination node, and the transfer value, spawning an event generation process for each of the plurality of relationships, wherein respective event generation processes are configured to generate events for respective relationships; transmitting update data to at least some of the event generation processes based on user-defined modification data; spawning at least one additional event generation process based on the update data; and streaming the event data to the request processor for transmission to a user device.

The request processor may be configured to receive data relating to the user-defined modifications concerning network topology. In addition, the simulation engine may be configured to at least one of add or remove nodes, add or remove relationships between nodes, and modify one or more of the relationship parameters.

In some embodiments, the simulation engine defines a conditionality parameter as one of the relationship parameters. In addition, the simulation engine may be configured to sample the event time from a Poisson distribution having the rate parameter, and the least one rate parameter may be time-dependent.

In some embodiments, the simulation engine is configured to output the event data in a standard format, which may be the ISO 20022 format.

In some embodiments, at least one rate parameter is time-dependent. Advantageously, this allows simulation of increased or decreased network traffic according to known fluctuations, thus allowing determination of the impact on network performance.

In another aspect, the present disclosure relates to a network event simulation process involving a network simulation system that includes a request processor and a simulation engine which operates in accordance with that which is disclosed by any of the preceding paragraphs.

The process may comprise formatting the event data in a standard format, such as ISO 20022 format or another format suitable for financial network transaction messages. Advantageously, in conjunction with the other elements of the network event simulation process, it is thereby possible to generate realistic transaction data which can be used for downstream analysis and/or network performance testing without needing to deal with data privacy issues.

In yet a further aspect, the present disclosure relates to a non-transitory computer-readable medium having instructions stored thereon which, when executed, cause at least one processor to perform a process according to any of the preceding paragraphs.

DETAILED DESCRIPTION

Embodiments of the invention will now be described with reference to the accompanying drawings, in which.

Embodiments generally relate to a network simulation system and process that generate events, such as transactions, between nodes that are related by a computer network, such as a payments network. The events may be generated stochastically and/or in accordance with a fixed schedule. The event generation processes are balance-modifying, in that network events can result in changes to the available resources at respective nodes (such as available funds, in the context of nodes that are accounts in a payments network). Additionally, event rates need not follow real-world time, and in particular can be generated at a much higher rate than real-world time.

Advantageously, the network topology can be modified by a user located remotely from the network simulation system, for example via a RESTful API while an instance of the simulation is running, allowing complex, coordinated behaviours to be simulated, and to allow for locale-specific simulation.

Figure 1:
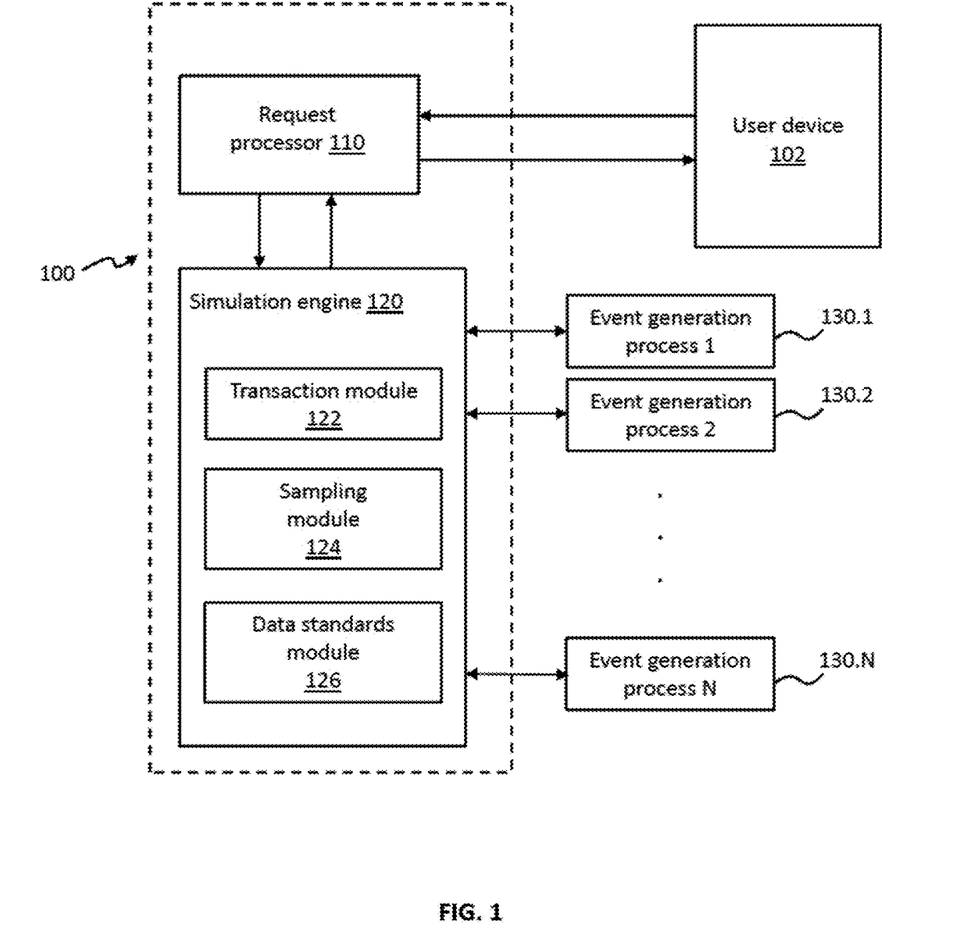
FIG. 1 depicts an embodiment of a network simulation system in communication with a remotely located user.

Referring initially to FIG. 1, there is shown in schematic form the architecture of a network simulation system 100 which is in communication with a user device 102. The user device 102 may make requests to network simulation system 100, for example to start an instance of a network simulation, and/or to modify the network topology. The requests are received by the request processor 110 of network simulation system 100. Request processor 110 may then invoke simulation engine 120 in order to generate network event data, which is subsequently returned to request processor 110 for output as a stream of events to user device 102. The rate of events and format of the event data may be controlled by request processor 110 and simulation engine 120 and may be modified in accordance with requests from the user device 102 in a manner which will be described in more detail below.

Although the simulation system 100 is shown in communication with a remotely located user 102 in FIG. 1, it is also possible for instances of the simulation to be started directly by a user at simulation system 100, or in automated fashion by a script executing on the simulation system 100, for example.

Figure 2:
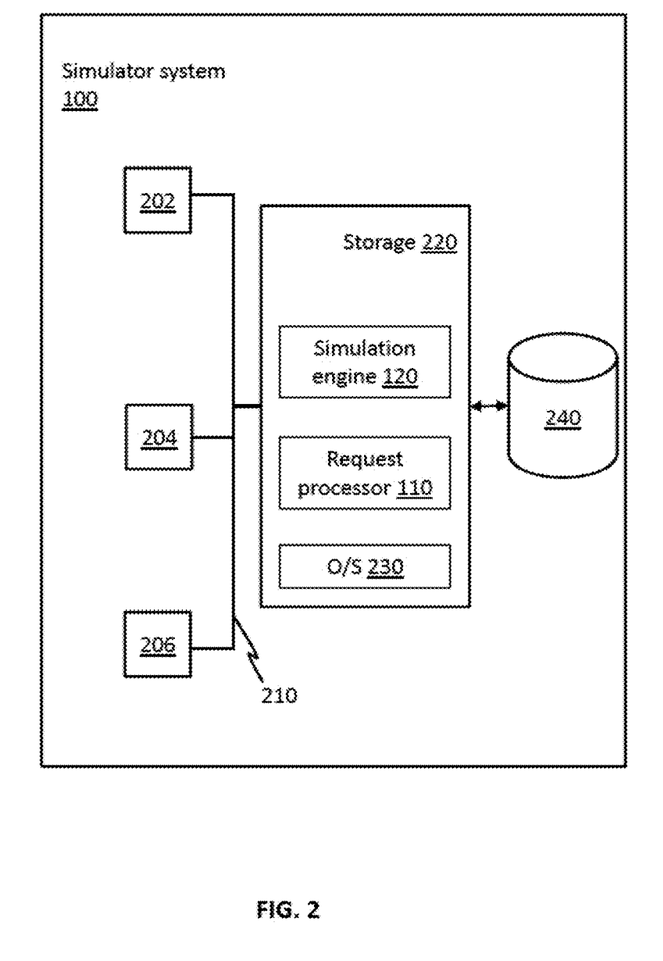
FIG. 2 is an exemplary architecture of a network simulation system.

The architecture of the network simulation system 100 is shown in more detail in FIG. 2. The network simulation system 100 may comprise at least one server 200 having at least one processor 202, volatile storage (RAM) 204, at least one network interface 206, and non-volatile storage (e.g., one or more magnetic disks and/or one or more solid-state drives) 220, all interconnected by a bus 210. A single server 200 is shown in FIG. 2, though it will be appreciated that a network simulation system 100 may include multiple such servers.

The non-volatile storage 220 has stored thereon a plurality of modules, including operating system 222, request processor 110, and simulation engine 120 (and its sub-modules 122, 124, 126). Typically, these modules are implemented as software components, but it will be appreciated that they may encompass hardware, software, or a combination of hardware and software. As such, one or more of the modules 110, 120, 122, 124, 126 may exist as separate hardware components on the server 200 or on another server which is in communication with server 200, for example. Any of the modules shown in FIG. 2 may be implemented in whole or in part as one or more application-specific integrated circuits (ASICs), field-programmable gate array (FPGAs), or other integrated circuit device in which the logic embodied in the module is implemented. In addition, the boundaries between modules as depicted are exemplary only, and it would be possible to implement alternative modules which perform the functions of any two or more of the modules shown in FIGS. 1 and 2.

Input data to the request processor 110 and/or the simulation engine 120 may optionally be stored in a data store 240 which resides on, or is in communication with, storage medium 220. In particular, data store 240 may store data relating to the network topology (both as originally input and as modified during the course of a simulation), and to events generated by the simulation engine 120.

In order to generate network events, the request processor 110 is configured to receive (e.g., from user device 102) input data relating to a topology of the network. The input data comprises node data indicative of respective resource levels of a plurality of nodes of the network, and relationship data indicative of respective relationship parameters of a plurality of relationships between at least some of the nodes. The relationship parameters for a given relationship between two nodes include at least a rate parameter, indicating a rate at which events between the two nodes occur, and a transfer value parameter, based on which the simulation engine 120 can determine the amount of a resource to transfer between the nodes. For example, in the context of a payments network, the transfer value parameter may be a mean of a transaction value distribution of a certain mathematical form (e.g. a uniform or normal distribution), or may comprise values of an empirical distribution. The distribution may be sampled from, by the simulation engine 120, in order to determine the level of funds to be transferred between the nodes (accounts). In cases where the sampled value is negative, and the simulated network is a payment network, the sampled value may be replaced by zero, a small non-zero value (such as £0.01), or some other predefined minimum transaction value. Alternatively, the transfer value parameter may be a fixed value.

The simulation engine 120 may be configured to spawn an event generation process for each relationship defined by the network topology. For example, as shown in FIG. 1, the network topology comprises N relationships, each associated with a respective event generation process 130.1, 130.2, . . . , 130.N. Each event generation process 130.1, . . . , 130.N has as input the parameters of the network relationship with which it is associated, and as output a stream of simulated network events, which are streamed to simulation engine 120 and then in turn to request processor 110, which may in turn stream events to user device 102.

Figure 3:
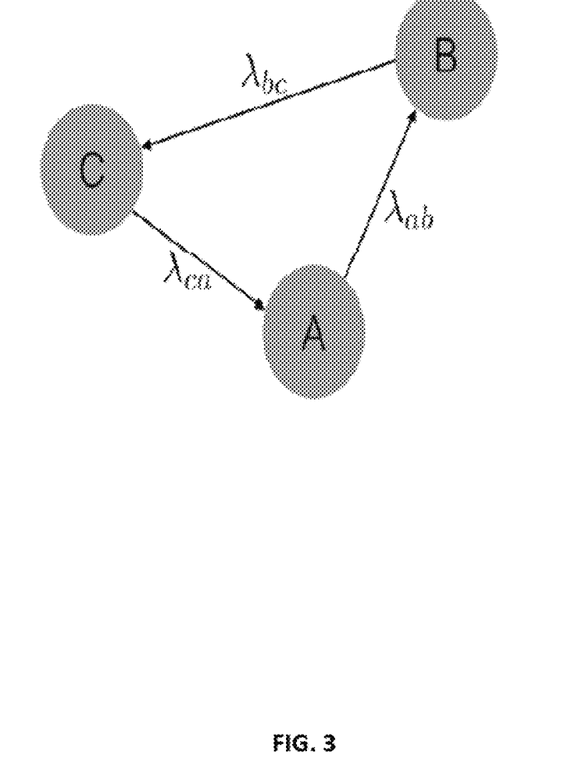
FIG. 3 is an example of a network topology suitable for simulation by the network simulation system.

An example of an input network topology is shown in FIG. 3, in which three nodes A, B and C are shown. Nodes A and B have a relationship characterised by a parameter $\lambda_{ab}$, nodes B and C have a relationship characterised by $\lambda_{bc}$, and nodes A and C have a relationship characterised by $\lambda_{ca}$. Each node A, B and C has a starting resource level, which can be provided via user input, for example. The respective λ s are rate parameters for the respective relationships. In general, each relationship will also have a transfer value parameter or parameters associated with it, as discussed above. For example, relationship A-B may be associated with a single fixed transfer value, relationship B-C may be associated with an empirical distribution of transfer values that can be sampled from (e.g. a set of real transaction values associated with a bank account over a period of time, such as a year), and relationship C-A may be associated with transfer parameters ($\mu$, $\sigma$) which are the mean and standard deviation of a normal distribution of transfer values.

It will be appreciated that the example shown in FIG. 3 is illustrative only, and that a realistic simulated network topology may contain hundreds, thousands or even tens of thousands of nodes and relationships.

The input data representing the network topology may be provided to the request processor 110 in various ways. For example, an input file containing the initial node data and relationship data may be read by the request processor 110 and the various parameters stored in data store 240. Alternatively, a user device 102 may transmit requests to the request processor 110 to generate the desired network structure. This may be done interactively by the user, or more typically, as a batch, for example using a script or other means of automation such as a wrapper function which has input parameters such as the number of nodes to be created, a list of nodes which are to have relationships, and so on.

In order to generate a network topology that provides as realistic an approximation as possible to the network being simulated, the network simulation system 100 (for example, via request processor 110), or a module executing on the user device 102, may employ a random graph generation algorithm which is configured to reproduce the desired network characteristics. For example, the algorithm may generate graphs according to the Watts-Strogatz model, the Erdös-Rényi model, or the Barabási-Albert model. In some embodiments, the network simulation system 100 may receive empirical network topology data relating to one or more known networks of the appropriate type (e.g. payment networks), and derive, from the empirical network topology data, suitable parameters as input for the random graph generation algorithm.

In some embodiments, network relationships can be initialised in such a way that they are mutually independent of other relationships. Accordingly, the event generators spawned by simulation engine 120 produce output streams that are also independent of each other.

In other embodiments, it may be desirable to generate event data in an order which is dictated by the network hierarchy, such that there are dependencies between at least some of the event generation processes. For example, in the context of simulated fraud in a payments network, the network hierarchy may comprise a first account (node) associated with a victim being defrauded, and a plurality of other accounts (nodes) to which the victim's funds are dispersed.

In order to implement conditionality for a network relationship, simulation engine 120 may define a conditionality parameter as one of the relationship parameters. For example, the conditionality parameter c may lie in the range from 0 to 1, and the associated event generation process 130.1 may sit in a "wait" mode until a proportion c of inbound relationships (i.e., relationships for which the target node has the same identifier as the source node of the relationship in question) generates transaction events before its own transaction generation will begin. This mechanism allows for fully or partial conditional networks to be implemented alongside stochastic relationships. The conditional relationships could also change through the course of the simulation, by updating the conditional parameter, thereby effectively changing the way funds were flowing around the network. The total number of inbound relationships, and the number which have transacted, may be passed by simulation engine 120 as input parameters to the event generation process 130.1.

In other embodiments, event generation process 130.1 may sit in "wait" mode until a specific inbound relationship, or set of inbound relationships, has generated one or more transaction events.

In certain embodiments, such as those relating to payment networks, it may be desirable to associate additional data with nodes and/or relationships in the network. For example, if each node is a bank account then it may be desirable to associate a person's name (such as "John Smith") with each node, as well as a bank name (such as "RBS"). In this case, in order to generate more realistic node data, the additional data may be sampled from appropriate empirical distributions such as census-derived name distributions and known distributions of bank accounts by market share. Other types of data associable with nodes or relationships, for which empirical distributions may be used to generate suitable values, include industry codes, sort codes (distributed by geography and/or bank code), bank balances, and activity level (for example, an account used to perpetrate fraud will typically have a much higher activity level than a normal account).

The request processor 110 may be configured to receive requests to modify the network topology, for example from a remotely located user 102 by way of a RESTful API. For example, user 102 may add a node (account) to the network by a command such as:
curl<server_name>:port/account-d {"SortCode":"00-00-00", "AccountNumber": "12345678","Name":"Mr John Smith","Balance":"9999"}

This creates an account having a sort code of 00-00-00, an account number of 12345678, and a balance of 9999 in the currency of the simulation (for example, GBP), and having an account name of Mr John Smith. Here, <server_name> is the server on which the instance of the simulation is being run, and <port> is the port on that server over which the user device 102 is connected or authorised to connect. In some embodiments, a bank code may also be associated with the created node, though it will be appreciated that a sort code may act as a proxy for a bank code.

In another example, user 102 may create a relationship between a source node having an ID of 00-00-0012345678 and a destination node having an ID of 11-11-1187654321 by a command such as the following:
curl<server_name>:port/relationship-d {"SourceId":"00-00-0012345678","TargetId":"11-11-1187654321","Rate": "9.99"}

Here, the source and destination node identifiers have been generated by concatenating the respective sort code and account number that were used to create the respective nodes. The Rate specified in the above command is the rate parameter for the relationship (i.e., $\lambda$ as discussed above).

Once created, nodes or relationships may be modified, via API calls analogous to the above, by using the respective node identifier or relationship identifier (which may be a concatenation or other unique combination of the source node identifier and target node identifier, for example). For example, a node may be deleted via a HTTP DELETE call using the node identifier, or may be updated via a HTTP PUT call using the node identifier.

Thus, as described above, an instance of the network event simulator can be run on a server 100 and users 102 can then interact with the underlying simulation as it is running. The simulation functions may allow for accounts and relationships to be added, removed or modified via API calls. This advantageously allows users 102 to change both account and relationship level properties of the underlying network in real time.

The simulation engine 120 is configured to produce a stream of network events, such as transactions, for each relationship in the simulated network. In certain embodiments, each relationship (and thus each event generation process 130.1, . . . , 130.N) is associated with an underlying point process, such as a Poisson process, and the time between transactions is calculated depending on the underlying point process. After the correct amount of time according to the simulation has passed, a transaction value is generated and a request is made as to whether the transaction can occur. This is governed according to the source node balance (resource level); if it has sufficient funds then the transaction is allowed to occur, otherwise it is rejected.

Figure 4:
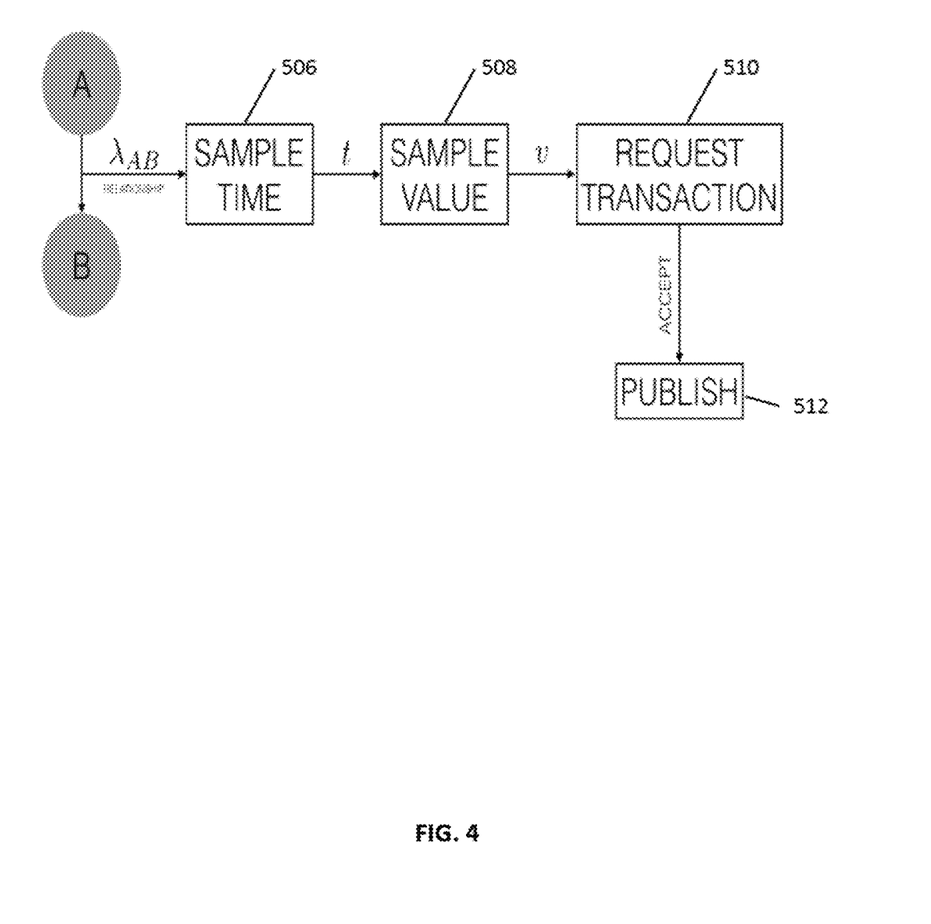
FIG. 4 depicts the flow of an example network event generation process.
Figure 5:
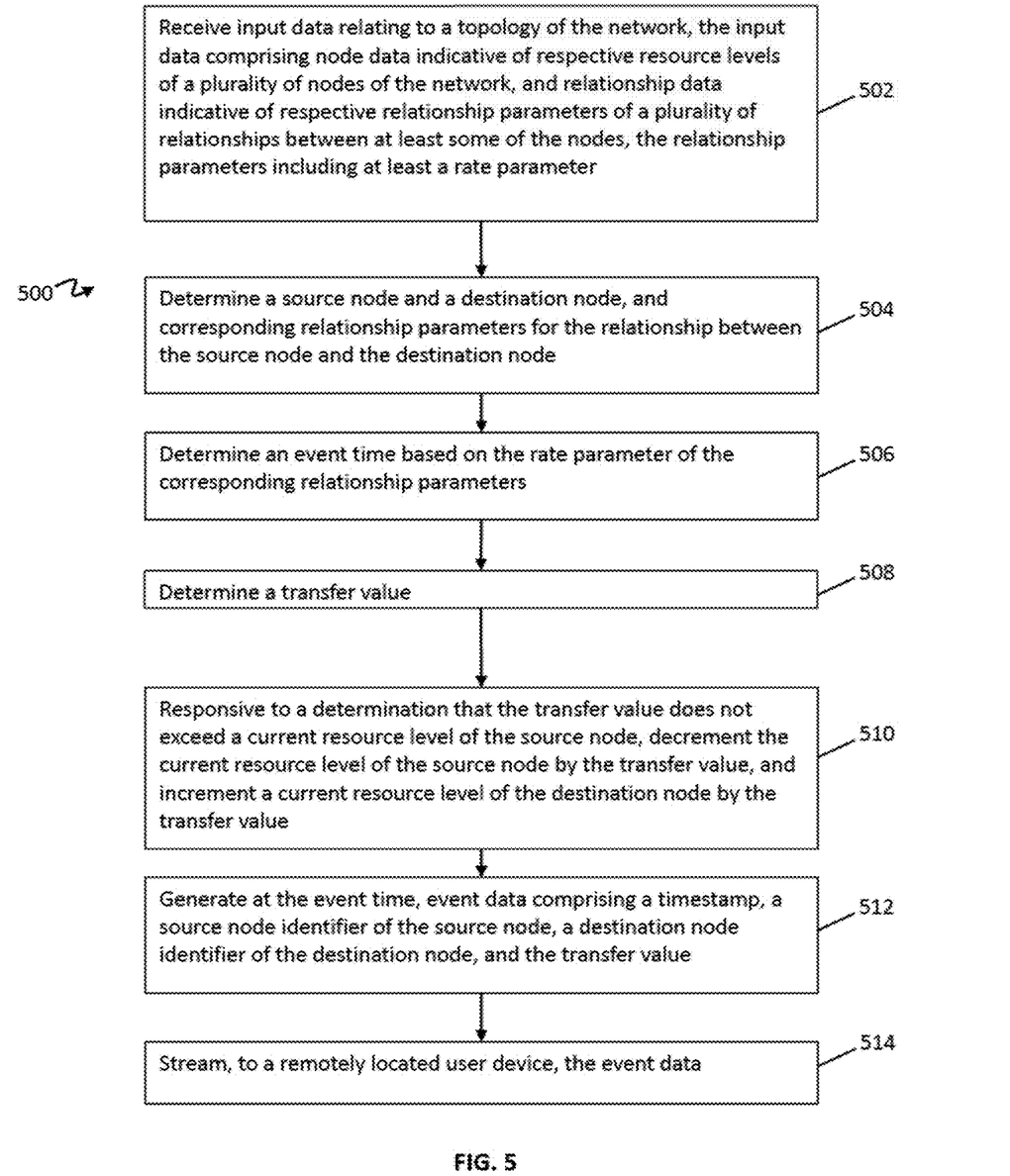
FIG. 5 is a flow diagram of an example network simulation process.

An exemplary network simulation process 500 is shown in FIGS. 4 and 5. In FIG. 4, a schematic representation of the process flow is shown, in which nodes A and B have a relationship characterised by a rate parameter $\lambda_{AB}$.

Referring to FIG. 5, the process 500 begins at step 502 with the system 100 receiving input data relating to a topology of the network. This may be from user device 102, via request processor 110, for example. The input data comprises node data indicative of respective resource levels, such as account balances, of a plurality of nodes of the network, and relationship data indicative of respective relationship parameters of a plurality of relationships between at least some of the nodes, the relationship parameters including at least a rate parameter and a transfer value parameter.

At step 504, the process determines a source node, such as node A, and a destination node, such as node B, and corresponding relationship parameters for the relationship between the source node A and the destination node B. The relationship parameters may include the rate parameter $\lambda_{AB}$ and a parameter of a distribution of transfer values, for example (e.g., $\mu$ and $\sigma$ of a normal distribution as discussed above in relation to FIG. 3). At this point, the process may spawn an event generation process, such as event generation process 130.1, for the AB relationship.

At step 506, the event generation process 130.1 may invoke the sampling module 124 of simulation engine 120 to sample a transaction time t (more specifically, a time to the next transaction) from the underlying point process associated with the AB relationship, for example a Poisson process with rate parameter $\lambda_{AB}$.

Next, at step 508, the sampling module 124 samples a transaction value v using the transfer value parameter(s) of the AB relationship.

At step 510, the event generation process 130.1 requests, at transaction module 122, a transaction at time t with value v from the source node A to the destination node B. Transaction module 122 checks the transfer value v against the resource level (balance) of node A.

If the resource level is sufficient, then the transaction is accepted, and at step 512, a transaction message is generated. The transaction message may include at least a timestamp, a source node identifier of the source node, a destination node identifier of the destination node, and the transfer value v. The transaction message may also include an indication that the transaction event is a synthetic event (i.e., not generated by a real payment network), and may include versioning information to indicate which version of the simulator was used to generate it. The transaction module 122 also updates the resource levels of nodes A and B by decrementing node A by v and incrementing node B by v.

At step 514, the transaction data may be passed to the request processor 110 to be transmitted to user device 102.

As mentioned above, a Poisson point process can be used to model the inter-arrival time between transactions and is described by a single parameter $\lambda$. For a relationship represented as a Poisson process with parameter $\lambda$ in a simulation started at time t=0, each subsequent inter-arrival time is generated by sampling exponential random numbers with parameter $\lambda$. In practice this can be related to relationships that transact with a relatively fixed frequency i.e. if a source account pays a destination account X times per time period, such as in a month, then setting $\lambda$=X will result in a stream of transactions that, as a long-term average, will produce X number of transactions between source and destination for every month in the simulation.

In some embodiments, the underlying process associated with a relationship may be non-Poisson, or may be a sum of different types of processes (including Poisson and non-Poisson). For example, the underlying process may be a sum of a Poisson process, representing randomly distributed transaction times, and a process which produces events at fixed time intervals (e.g., once per month, indicating a regular monthly payment). Accordingly, it is possible to include various types of fixed frequency transactions e.g. transactions similar to direct debits and standing orders in nature. In combination this may enable all users to build rich dynamical datasets that can simulate known behaviours.

The sum of Poisson processes with parameters $\lambda_1$, $\lambda_2$, $\lambda_3$, . . . , $\lambda_n$ is itself a Poisson process with $$\lambda = \sum_{i=1}^{n} \lambda_i$$

Accordingly, it is possible to tune a simulated dataset to a certain desired volume of transactions over timescales of interest in a very elegant way. In particular, for use cases such as determining the ability of a network to cope with a certain transaction volume (both in terms of bandwidth and storage), where rich dynamics are not required, a network with n relationships obeying the above equation is sufficient.

The above can be modified to include dynamics such that $\lambda$ is no longer constant or stationary, but rather varies with time i.e. $\lambda \rightarrow \lambda(t)$. Advantageously, the form of $\lambda(t)$ can then be modelled to capture variations in the transaction rate. For example around the end of the tax year or at Christmas and New Year the rate of transactions might increase or decrease depending on the payment network being considered.

Advantageously, in the context of payment networks, the simulation system is not constrained to replicate any particular payment system, since it generates transaction events based on collections of point processes. In this way the simulator is completely agnostic to the type of dataset being constructed. Optionally, the generated transactions may be transformed to be compliant with a particular payment data standard, such as ISO8583 or ISO20022. This can be achieved via a data standards module 126 of the simulation engine 120. By making the output compliant with a standard such as ISO8583 or ISO20022, the user 102 has the flexibility to simulate any payment system they wish, adapting the simulation output to their particular needs. A data element of the ISO8583 or ISO20022 message may carry the indication that the event is synthetic and/or the versioning information for the simulator.

Embodiments may have one or more of the following advantages:

1. Enabling testing of algorithms. One of the key advantages of a synthetic dataset generated according to the process described above is that it enables testing of algorithms, such as fraud detection algorithms, on realistic data. For example, the network simulation system allows modification of the network topology such that particular nodes are much more active than usual, a known indicator of fraud in the context of payment networks. Accordingly, a stream of transactions incorporating such known fraudulent accounts can be passed to a fraud detection algorithm in order to test whether the algorithm is capable of detecting this injected signal. In addition, due to the flexibility of the framework described above, various scenarios can be simulated in order to help refine and improve existing algorithms.

2. Facilitating developer testing. Since the system and process described above enable generation of realistic data sets on short time scales, and may be made e.g. ISO20022 compliant without being restricted to a particular payments framework, users 102 may generate sufficient data volumes adapted to their desired format in order to perform stress testing of a network. Such stress testing may include tests such as checking whether messages are of the correct format, whether algorithms designed to check network integrity find mistakes in network messages, whether peak day volumes affect the performance of software, and whether there is sufficient database storage to cope with surges in network traffic.

3. Working with Sensitive Data. To be able to work with a dataset that is synthetic circumvents the need to be in a secure environment to build and test algorithms. Much of the testing work can be done using the synthetic data as input, and once the initial testing has shown that the algorithms are working as expected, the code can be tested against real data in the secure environment.

4. Visualisation & Demos. Having synthetic data allows generation of very rich and detailed visualisations and demos that can be used to demonstrate algorithm results.

5. Proofs of Concept. As well as testing algorithms as mentioned above, having a synthetic dataset allows for more exploratory work to be done without the need for permissions to be sought first.

Ultimately, embodiments of the invention enable a secure, principled approach to simulating network data which gives users the freedom to interface with the simulator science focused on payments or other sensitive network data that would otherwise present enormous privacy and security risks.

What is claimed is:

1. A system for simulating a network, comprising:
   A hardware request processor of a network simulation system configured for receiving a request for network simulation data and input data relating to a topology of a network, the input data comprising:
      node data indicative of respective resource levels of a plurality of nodes of the network, and
      relationship data indicative of respective relationship parameters of a plurality of relationships between at least some of the plurality of nodes, the relationship parameters including a rate parameter and a transfer value parameter; and
   a hardware simulation engine of the network simulation system operably connected to the hardware request processor, wherein the hardware simulation engine outputs a stream of event data that is based on the relationship data to the hardware request processor, and wherein the hardware simulation engine generates respective events of the stream of event data by:
      determining a source node and a destination node, and corresponding relationship parameters for a relationship between the source node and the destination node;
      determining an event time based on the rate parameter of the corresponding relationship parameters;
      determining a transfer value based on the transfer value parameter and a random sampling from a transfer value distribution; and
      responsive to a determination that the transfer value does not exceed a current resource level of the source node,
         decrementing the current resource level of the source node by the transfer value,
         incrementing a current resource level of the destination node by the transfer value,
         generating, at the event time, event data comprising a timestamp, a source node identifier of the source node, a destination node identifier of the destination node, and the transfer value,
      spawning an event generation process for each of the plurality of relationships, wherein respective event generation processes are configured to generate events for respective relationships;
      transmitting update data to at least some of the event generation processes based on user-defined modifications;
      spawning at least one additional event generation process based on the update data; and
      streaming the event data to the request processor for transmission to a user device.

2. The system of claim 1, wherein the hardware request processor is configured to receive data relating to the user-defined modifications concerning network topology.

3. The system of claim 1, wherein the hardware simulation engine is configured to at least one of add or remove nodes, add or remove relationships between nodes, and modify one or more of the relationship parameters.

4. The system of claim 1, wherein the hardware simulation engine defines a conditionality parameter as one of the relationship parameters.

5. The system of claim 1, wherein the hardware simulation engine is configured to sample the event time from a Poisson distribution having the rate parameter.

6. The system of claim 1, wherein the rate parameter is time-dependent.

7. The system of claim 1, wherein the hardware request processor is configured for formatting the event data in a standard format prior to transmitting the event data to the user device.

8. A network event simulation process, comprising:
   receiving, by a network simulation system comprising a request processor and a simulation engine, input data and a request for network simulation data, the input data comprising node data indicative of respective resource levels of a plurality of nodes of the network, and relationship data indicative of respective relationship parameters of a plurality of relationships between at least some of the plurality of nodes, the relationship parameters including a rate parameter and a transfer value parameter;
   generating, by the simulation engine of the network simulation system, a stream of event data based on the relationship data, wherein respective events of the stream of event data are generated by:
      determining a source node and a destination node, and corresponding relationship parameters for relationship between the source node and the destination node;
      determining an event time based on the rate parameter of the corresponding relationship parameters;

determining a transfer value based on the transfer value parameter and a random sampling from a transfer value distribution; and responsive to a determination that the transfer value does not exceed a current resource level of the source node,     decrementing the current resource level of the source node by the transfer value,     incrementing a current resource level of the destination node by the transfer value,     generating, at the event time, event data comprising a timestamp, a source node identifier of the source node, a destination node identifier of the destination node, and the transfer value;

spawning an event generation process for each of the plurality of relationships, wherein respective event generation processes are configured to generate events for respective relationships;

transmitting update data to at least some of the event generation processes based on user-defined modifications;

spawning at least one additional event generation process based on the update data; and streaming the event data to the request processor for transmission to a user device.

9. The network simulation process of claim 8, wherein the request processor of the network simulation system is configured to receive the user-defined modifications.

10. The network simulation process of claim 8, wherein the user-defined modifications comprises data indicating at least one of addition or removal of nodes, addition or removal of relationships between nodes, and modification of one or more of the relationship parameters.

11. The network simulation process of claim 8, wherein the simulation engine defines a conditionality parameter as one of the relationship parameters.

12. The network simulation process of claim 8, wherein the event time is sampled from a Poisson distribution having the rate parameter.

13. The network simulation process of claim 8, wherein the rate parameter is time-dependent.

14. The network simulation process of claim 8, further comprising formatting, by the request processor, the event data into a standard format prior to transmitting the event data to the user device.

15. A non-transitory computer-readable medium having instructions stored thereon which, when executed, cause at least one processor to:

receive input data and a request for network simulation data, the input data comprising node data indicative of respective resource levels of a plurality of nodes of the network, and relationship data indicative of respective relationship parameters of a plurality of relationships between at least some of the plurality of nodes, the relationship parameters including a rate parameter and a transfer value parameter;

generate a stream of event data based on the relationship data, wherein respective events of the stream of event data are generated by:

determining a source node and a destination node, and corresponding relationship parameters for relationship between the source node and the destination node;

determining an event time based on the rate parameter of the corresponding relationship parameters;

determining a transfer value based on the transfer value parameter and a random sampling from a transfer value distribution; and     responsive to a determination that the transfer value does not exceed a current resource level of the source node,         decrement the current resource level of the source node by the transfer value,         increment a current resource level of the destination node by the transfer value,         generate, at the event time, event data comprising a timestamp, a source node identifier of the source node, a destination node identifier of the destination node, and the transfer value;

spawn an event generation process for each of the plurality of relationships, wherein respective event generation processes are configured to generate events for respective relationships;

transmit update data to at least some of the event generation processes based on user-defined modifications;

spawn at least one additional event generation process based on the update data; and stream the event data for transmission to a user device.

\* \* \* \* \*